United States Patent [19]

Lampietti

[11] Patent Number: 4,484,499
[45] Date of Patent: Nov. 27, 1984

[54] REAR PORTION SUPPORTING MECHANISM IN APPARATUS FOR MACHINING ELONGATED WORKPIECES

[75] Inventor: Bernard P. Lampietti, Goshen, Conn.

[73] Assignee: Torin Corporation, Torrington, Conn.

[21] Appl. No.: 394,339

[22] Filed: Jul. 1, 1982

[51] Int. Cl.³ .............................................. B23B 5/14
[52] U.S. Cl. .......................................... 82/48; 82/20; 82/101; 82/102; 82/38 R
[58] Field of Search ................. 82/20, 38 R, 101, 102, 82/48

[56] References Cited

U.S. PATENT DOCUMENTS 2,788,887  4/1957  Johnson et al. ......................... 82/20
3,200,678  8/1965  Lindemann ............................ 82/20

FOREIGN PATENT DOCUMENTS 534051   9/1931  Fed. Rep. of Germany ..... 82/38 R
2725746 12/1978  Fed. Rep. of Germany ........ 82/102
691256  10/1979  U.S.S.R. ................................. 82/101

*Primary Examiner*—Leonidas Vlachos
*Attorney, Agent, or Firm*—McCormick, Paulding & Huber

[57] ABSTRACT

Apparatus for successive cut-off operations at axially spaced locations along an elongated tubular workpiece wherein the workpiece is rotated during cut-off operations and successively advanced axially between such operations. The cut-off operations occur at a work station where a front portion of the workpiece is successively advanced, rotated and severed with an elongated portion of the workpiece extending rearwardly from the work station. A pair of elongated guide and support rails extend adjacent the rearwardly projecting portion of the workpiece and mount a workpiece supporting mechanism which is freely moveable therealong toward and away from the work station. The mechanism comprises a freely rotatable collet assembly adapted to grip and release the workpiece. Operating means for the collet assembly comprise a handwheel, a gear train, and a shell cam which is rotatable through a limited angle and axially moveable at the urging of the handwheel and gear train. Axial cam movement results in axial movement of a collet actuating sleeve to open the collet and a compression spring closes the collet. An auxiliary collet opening arm mounted on the shell cam is engaged by a fluid operated cylinder to rotate the cam and automatically open the collet when the workpiece supporting mechanism is incrementally drawn forwardly along the guide rails by the successively advancing workpiece to a position of proximity with the work station.

7 Claims, 5 Drawing Figures

4,484,499

REAR PORTION SUPPORTING MECHANISM IN APPARATUS FOR MACHINING ELONGATED WORKPIECES

BACKROUND OF THE INVENTION

Elongated cylindrical workpieces such as bar and tube stock are used in a wide variety of machining operations involving the successive machining of a workpiece at axially spaced locations along the workpiece. That is, a common machining technique involves the rotation of bar or tube stock and the successive advance of the stock for successive machining operations at a work station. Tube cut-off operations are commonly carried out in this manner. Thus, rotary cutting wheels may be located at a work station for radial movement toward and away from a lead or front end section of an elongated tube or length of tubular stock. As the tube is rotated the cutting wheels are engaged therewith in a cut-off operation and the tube is thereafter advanced axially for successive cut-off operations with the cutting wheels withdrawn during axial advance of the tube and thereafter re-engaged with the tube.

In tube cut-off operations and other similar machining operations, an elongated rear portion of a tube or other cylindrical workpiece extends rearwardly from a work station and may be received in bushings mounted in a support frame which is moveable along guide rails or which may be fixed with the tube passing axially therethrough. In either event, the rear support mechanism may prove inadequate for precise cut-off and other machining operations. That is, an elongated rearwardly extending tube portion which may be fifteen or twenty feet long may tend to vibrate or oscillate during high speed rotation which occurs simultaneously with the cut-off or other machining operation. This tends to impair the precision of the cut-off or other machining operation, may result in significant chatter and other noise conditions and also has an adverse effect on tool life, the vibration or oscillation being transmitted through the workpiece to the machining operation.

It is the general object of the present invention to provide, in a machining apparatus of the general type mentioned, an improved rear workpiece supporting mechanism which positively prevents workpiece vibration, and oscillation and which has the beneficial effects of enhancing the precision of the machining operation, reducing the incidental generation of undesirable noise, and substantially improving tool life.

SUMMARY OF THE INVENTION

In fulfillment of the foregoing object and in accordance with the present invention, an elongated guide and support means is provided in association with a work station for rotating, successively advancing, and machining an elongated cylindrical workpiece. The guide and support means extends adjacent a rearwardly extending portion of the workpiece and mounts a workpiece supporting mechanism which is freely moveable along the guide and support means toward and away from the work station. The workpiece supporting mechanism comprises a freely rotatable collet assembly adapted to firmly grip and release the workpiece at a rear portion thereof. Operating means for the collet assembly selectively causes the collet assembly to firmly grip a rear end portion of the workpiece when a front end portion thereof is presented to the work station for machining. Further, the operating means for the collet assembly is adapted to release the workpiece when it has been successively machined throughout a major portion of its length and when it has drawn the workpiece supporting mechanism forwardly incrementally along the guide means to a position of proximity with the work station. Preferably, a power operated means is provided for automatically causing the collet assembly to release the workpiece when the workpiece supporting mechanism has reached the selected position rearwardly of but in proximity with the work station. The undesirable vibration or oscillation of the workpiece rear portion is of course minimized if not eliminated as the length of the workpiece is reduced to a nominal dimension.

DESCRIPTION OF THE PREFERRED EMBODIMENT

Figure 1:
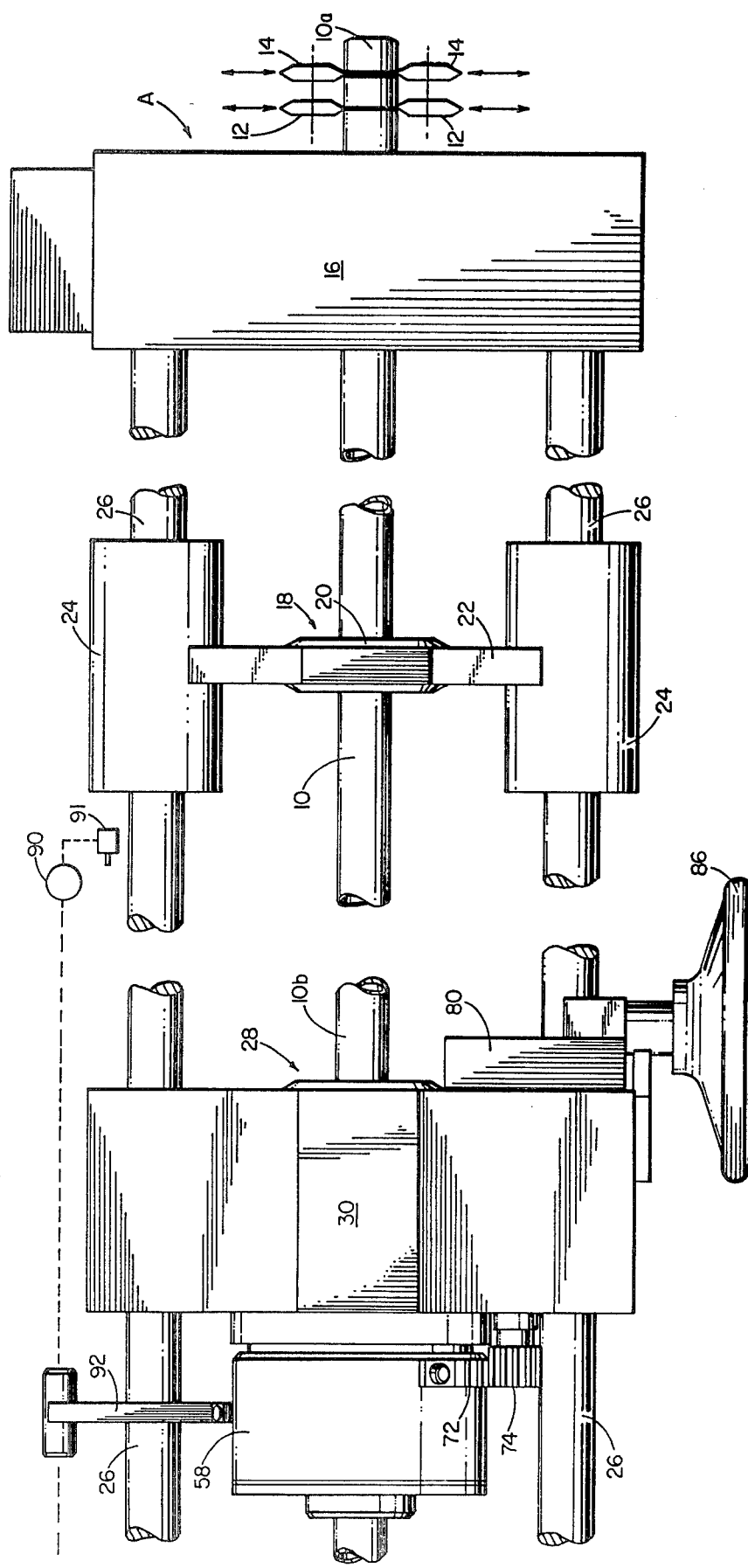
FIG. 1 of the drawings is a schematic illustration of a machining apparatus of the general type described above and includes a top view of the improved workpiece supporting mechanism of the present invention.

Referring particularly to FIG. 1, it will be observed that a work station is provided at A for a machining operation on a rotating workpiece, as shown, a cut-off operation on an elongated tubular workpiece 10 having a front end portion 10a. The tubular workpiece or section of tube stock 10 may be 18 to 20 feet long and projects rearwardly from the work station A to a rear section 10b. The cut-off operation shown involves the cutting of sections of the tube stock for bearing race blanks and must be carried out in a precise manner. That is, the axial dimension of the bearing race blanks must be established with a high degree of accuracy during cut-off. The cut-off tooling shown comprises first and second pairs of axially spaced cutting wheels 12,12 and 14,14. The cutting wheels 12,12 and 14,14 are moved radially toward and away from the workpiece front section 10a in unison and in a conventional manner with the cutting wheels 14,14 adapted for a limited degree of axial "float". Thus, the wheels 12,12 partially sever the workpiece and provide a V-shaped groove therein. The cutting wheels 14,14 thereafter provide a deeper cut with the floating arrangement thereof providing for an automatic alignment of the wheels with the V-shaped groove. Thus, a high degree of precision is achieved.

The cutting wheels 14,14 may sever a leading end blank completely, or, in the alternative, further tooling not shown may be provided. For example, the wheels 14,14 may provide an inwardly projecting rib at the cutting area and an axially moving tool may thereafter machine the I.D. of the tube to complete the cut-off operation. The precise nature of the cut-off or other machining operation at the work station A is not an essential part of the present invention and the invention instead relates to machining operations of the general type where the workpiece is rotated and successively advanced axially between machining operations.

A workpiece rotating and advancing mechanism 16 shown in block form in FIG. 1 may take a conventional form and may comprise a releasable collet means or other device and drive means for successively rotating the workpiece during the cut-off or other machining operation and for successively advancing the workpiece between such operations. With an elongated workpiece gripped and rotated rapidly at a front end portion, for example at speeds approaching 2,000 RPM, the rearwardly projecting portion thereof tends to oscillate and create chatter or other noise, as well as imprecise machining and loss of tool life at the front end portion, the oscillation being transmitted forwardly along the length of the workpiece. Guides and holding devices such as the assembly 18 in FIG. 1 have been provided in the past but have proven ineffective in high speed and precise machining operations. The guide and holding device 18 may comprise a bushing 20 through which the workpiece 10 projects, a frame member 22, and a pair of similar journal members 24,24 respectively mounted on and freely moveable along a pair of guide means or rails 26,26. In accordance with the present invention, a guide and holding device such as 18 may be employed at an intermediate location along the length of the workpiece 10 but a greatly improved workpiece supporting mechanism is employed at a rear portion of the workpiece 10b.

Thus, a workpiece supporting mechanism, indicated generally at 28, is mounted on the guide rails 26 and is freely moveable therealong as the workpiece 10 is advanced axially for successive machining operations at the work station A. The mechanism 28 includes a freely rotatable collet assembly which is adapted to firmly grip and release the workpiece 10 and which is operated to grip the workpiece on initial set up of the apparatus. That is, the workpiece 10 is entered forwardly through the mechanism 10, through the guide 18 if present, and into the mechanism 16. The mechanism 28 is then operated to cause the collet assembly to grip the workpiece firmly and thereafter proceed rightwardly in FIG. 1 in incremental movement as the workpiece is successively machined and advanced rightwardly at the work station A. When the rear portion 10b of the workpiece reaches a position of proximity with the work station A, support of the workpiece portion 10b is no longer necessary due to the relatively short length of the rearwardly projecting portion of the workpiece and the collet assembly within the mechanism 28 may be released to allow the workpiece to proceed rightwardly therefrom.

Figure 3:
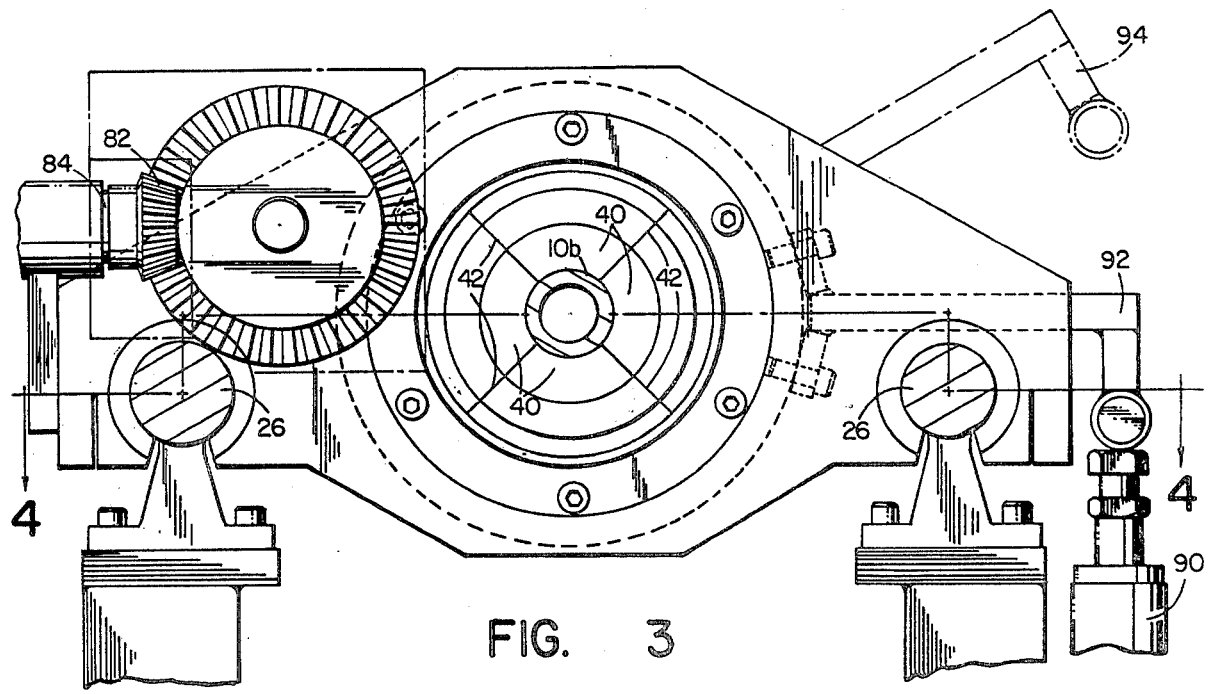
FIG. 3 is a front end view of the workpiece supporting mechanism.
Figure 4:
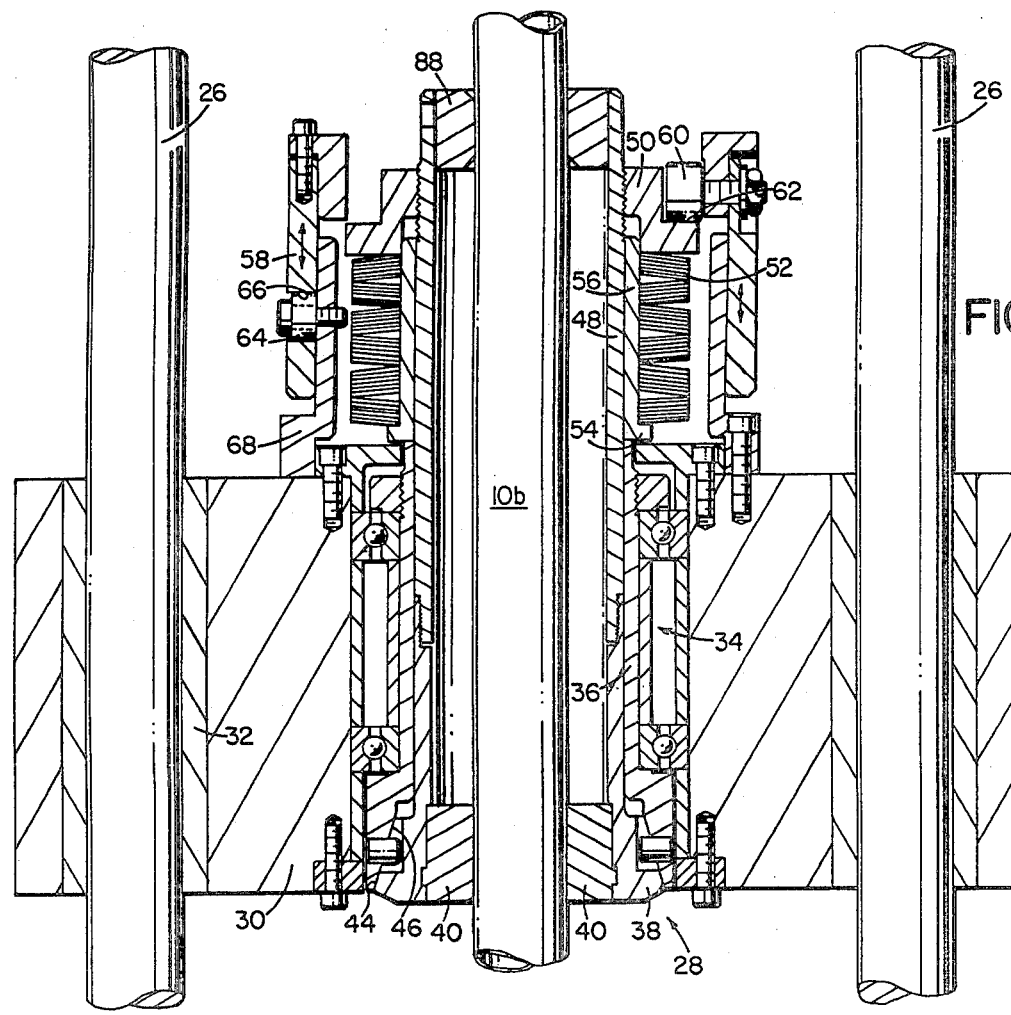
FIG. 4 is a horizontal section taken generally as indicated at 4,4, in FIG. 3 and with certain parts eliminated for clarity of illustration.

Referring now to FIG. 4, it will be observed that the workpiece supporting mechanism 28 includes a frame 30 which mounts a pair of bushings 32,32 which in turn receive the guide rails 26,26 for free sliding movement of the mechanism 28 along the guide rails. The frame 30 also supports a roller bearing assembly 34 which has disposed therewithin a freely rotatable but axially fixed sleeve 36. The sleeve 36 slidably receives a split collet 38 having associated pads 40,40. Four (4) collet pads are preferably provided and the sleeve 38 may be similarly split at a forward end portion thereof as illustrated in FIG. 3 at 42,42. The collet or collet sleeve 38 is moveable incrementally in an axial direction for opening and closing or gripping and releasing operation in a conventional manner. That is, the collet 38 may be moved slightly forwardly or rightwardly in FIG. 4 so that an inclined annular surface 44 thereon, cooperating with similar surface 46 on fixed sleeve 36, will permit the collet and its pad 40,40 to expand slightly for the axial entry and removal of the workpiece portion 10b. On leftward or rearward axial movement of the collet 38 the inclined annular surfaces 44,46 cooperate to cause the pads 40,40 to grip the workpiece portion 10b in the conventional manner.

Collet actuating sleeve 48 in FIG. 4 urges the collet 38 incrementally rightwardly and leftwardly or forwardly and rearwardly as required for opening and closing collet operation. Sleeve 48 has a threaded connection with the collet 38 at its front end portion and, at a rear end portion, the sleeve 48 is threadedly connected with annular spring seat 50. The spring seat 50 is urged leftwardly by compression spring 52 seated at its right-hand end at 54 and arranged about rotatable but axially fixed sleeve 56. As will be apparent, the spring 52 urges the axially moveable seat 50 rearwardly whereby to urge the actuating sleeve rearwardly together with the collet 38 in a collet closing or gripping operation.

Figure 2:
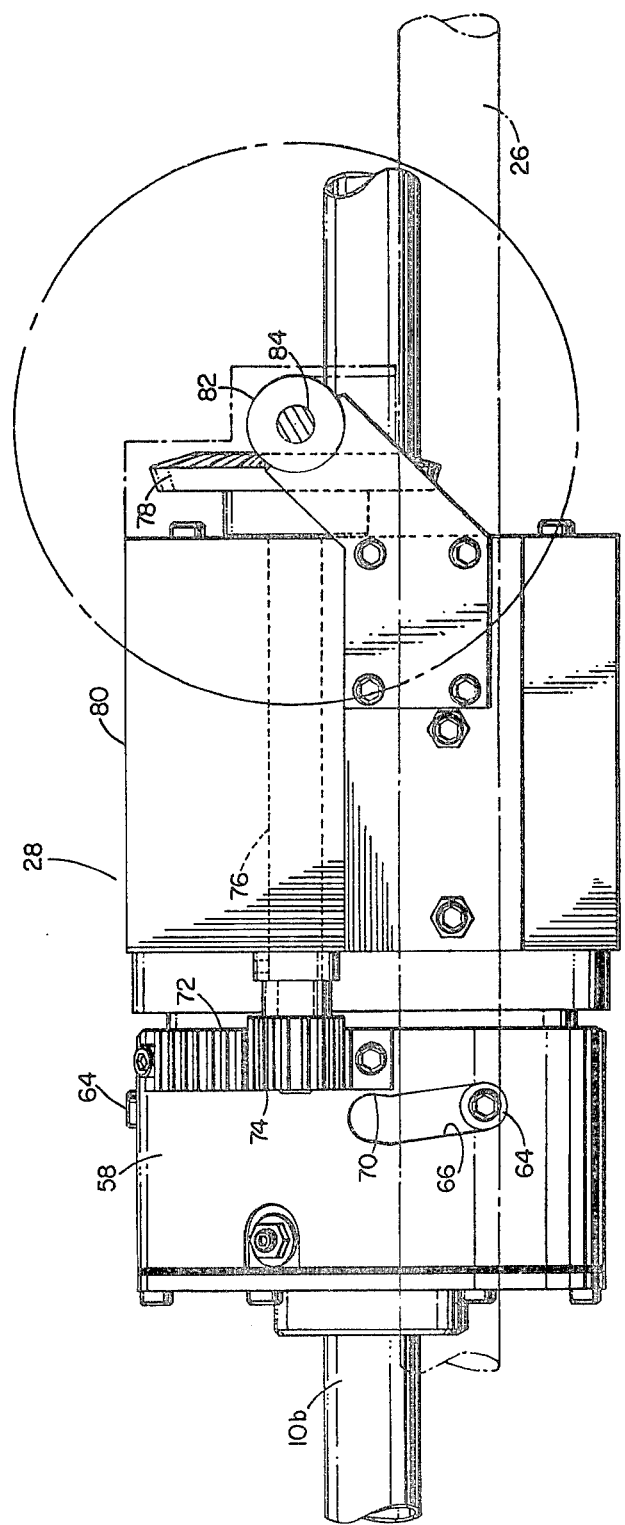
FIG. 2 is a side elevation of the workpiece supporting mechanism of the present invention.
Figure 5:
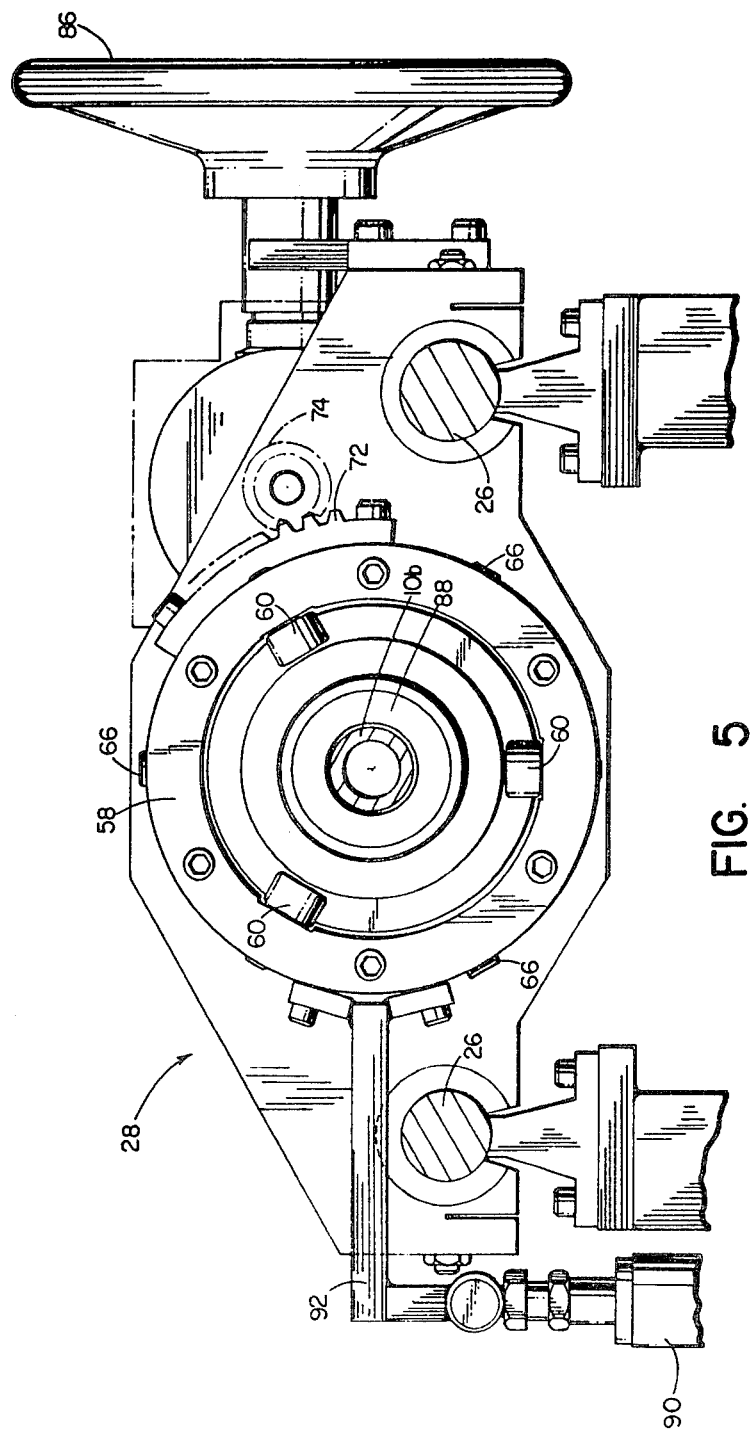
FIG. 5 is a rear end view of the workpiece supporting mechanism of the present invention.

The collet assembly 38,40 is opened or released by a shell cam 58 which carries a plurality of actuating rollers 60,60, three (3) shown in FIG. 5. The actuating rollers 60,60 engage a rearwardly facing annular flange surface 62 on the axially moveable spring seat 50. Thus, rightward or forward movement of the shell cam 58 serves to compress the spring 52 and open or release the collet assembly 38,40. A cam roller-slot arrangement is provided for moving the shell cam 58 incrementally forwardly and rearwardly as required and a single roller and slot are shown respectively at 64,66 in FIG. 4. In FIG. 2 a single cam slot is shown at 66 with associated cam roller 64 but three (3) such slot and roller arrangements are preferred. In FIG. 5 the three (3) rollers 66 are partially shown. Returning to FIG. 4, shell cam 58 is mounted about fixed sleeve 68 and is slidable forwardly and rearwardly relative thereto.

Referring to FIGS. 2 and 5, it will be seen that shell cam 58 may be rotated in the clockwise direction in FIG. 5, or with the top portion of the cam rotating downwardly and toward the viewer in FIG. 2 to urge the cam axially rightwardly or forwardly. As indicated above, rightward or forward movement of the cam causes the rollers 60,60 to compress the spring 52 and to open the collet assembly 38,40. Conversely, counterclockwise rotation of the shell cam 58 in FIG. 5 results in movement of the cam to the position shown in FIG. 2 and in a slight axial leftward or rearward movement of the cam allowing spring 52 to close the collet assembly 38,40. As will be apparent, a slight flat or radial surface 70 is provided in the cam slot 66 in FIG. 2 to prevent unintended or accidental rotation of the cam sleeve in the clockwise or collet assembly opening direction. The remaining slots 66,66 are similarly formed.

A manual means for operating the sleeve cam 58 is illustrated in FIG. 2 as comprising a gear segment 72 mounted on the cam and a pinion 74 operable in engagement with the segment to rotate the cam in one and opposite or clockwise and counterclockwise directions. The pinion 74 is mounted on a shaft 76, shown in broken line form in FIG. 2, and extending to a bevel gear 78 within a housing 80. The bevel gear 78 is in turn operated by handwheel actuated bevel gear 82, FIGS. 2 and 3, on a stub shaft 84 extending to handwheel 86, FIGS. 2, 3 and 5. As will be apparent, handwheel 86 may be rotated manually in one and an opposite direction whereby to rotate shell cam 58 as desired in opening and closing operation of the collet assembly 38,40.

In one mode of operation of the workpiece supporting mechanism of the present invention, the handwheel 86 is first rotated to open collet assembly 38,40 for the left to right or rear-to-front entry of a workpiece 10 through a rear bushing 88, FIG. 4, and collet assembly 38,40. The handwheel 86 is then rotated in an opposite direction causing the collet assembly 38,40 to close and firmly grip the workpiece 10 at the desired location. Thereafter, and as the workpiece progresses incrementally forwardly during machining and axial advance thereof, the workpiece supporting mechanism is drawn rightwardly along the guide rails 26,26 in FIG. 1 to a preselected position of proximity to the work station A. At such position, the handwheel 86 may be rotated in the collet opening direction whereby to free the workpiece 10 for further forward movement thereof and completion of the machining operation.

In a second mode of operation of the workpiece supporting mechanism 28, the workpiece is entered and secured within the mechanism with a rear portion of the workpiece held by the mechanism as described above. Thereafter, and as the machining operation progresses with the workpiece supporting mechanism drawn forwardly in FIG. 1, the collet assembly may be automatically released when the workpiece supporting mechanism reaches the desired or preselected position of proximity to the work station A. Apparatus for providing such operation may comprise a fluid operable cylinder 90 in FIG. 1 positioned vertically with its plunger moveable upwardly in response to operation of the cylinder by a position sensitive means such as an appropriate limit switch 91. When the plunger of the fluid operable cylinder 90 moves upwardly as illustrated in FIG. 3, an actuating arm 92 is engaged thereby and swung upwardly to the broken line position 94. The actuating arm 92 is mounted on the shell cam 58 as best illustrated in FIGS. 1, 3 and 5, whereby to cause the cam to be rotated in the clockwise direction and to release the collet assembly 38,40.

From the foregoing, it will be apparent that the apparatus of the present invention provides for precise cut-off or other successive machining operations on elongated cylindrical workpieces wherein the workpiece is rotated during the machining operation and successively advanced between such operations. Oscillation of rearwardly projecting portions of workpieces is positively prevented with highly beneficial results in the elimination of chatter, other noise conditions, and the accuracy of the machining operation is enhanced together with a substantial improvement in tool life.

I claim:

1. In apparatus for successively machining axially spaced sections of an elongated cylindrical workpiece wherein the workpiece is rotated and successively advanced axially during the machining operation; the combination of a work station including means whereby the workpiece is successively advanced, rotated and machined, and elongated portion of the workpiece extending rearwardly from the work station, elongated guide and support means extending adjacent the rearwardly extending portion of the workpiece, and a workpiece supporting mechanism mounted on said guide and support means and freely movable therealong toward and away from said work station, said mechanism comprising a freely rotatable collet assembly including a cam actuated axially split collet and pad assembly adapted to accept a rearwardly introduced workpiece and firmly grip and release the workpiece, cam follower means on said collet assembly, manual operating means for said collet assembly for selectively causing the collet assembly to firmly grip a rear end portion of the workpiece when a front end portion thereof is presented to the work station for machining, said operating means including a sleeve cam rotatable and axially movable in engagement with said cam follower means to actuate and open said axially split collet and pad assembly and biasing means in opposition to said sleeve cam for closing said collet and pad assembly, and said operating means having means for release of the workpiece when the workpiece has been successively machined throughout a major portion of its length and when the workpiece supporting mechanism has been correspondingly drawn forwardly along the guide means by the successively advancing workpiece to a position of proximity with the work station.

2. Apparatus for successively machining axially spaced sections of an elongated workpiece as set forth in claim 1 wherein said operating means includes gear means for rotating and axially moving said sleeve cam and a manually operable means for operating said gear means.

3. Apparatus for successively machining axially spaced sections of an elongated workpiece as set forth in claim 2 wherein said manually operable means takes the form of a handwheel rotatable in one and an opposite direction to operate said gear means and said biased sleeve cam to open and close said collet assembly.

4. Apparatus for successively machining axially spaced sections of an elongated workpiece as set forth in claim 3 wherein said sleeve cam is provided with an auxiliary actuating means for rotating and axially moving the same in the collet opening direction, and wherein a power operated means for engaging said actuating means is arranged adjacent said position of proximity of said workpiece supporting mechanism.

5. Apparatus for successively mounting axially spaced sections of an elongated workpiece as set forth in claim 4 wherein said auxiliary actuating means takes the form of a radially extending arm mounted on said sleeve cam, and wherein said power operated means comprises a fluid operable cylinder having an output member engageable with said actuating arm to rotate and axially move said sleeve cam for opening the collet assembly.

6. Apparatus for successively machining axially spaced sections of an elongated workpiece as set forth in claim 5 wherein said support and guide means takes the form of a pair of spaced parallel guide rails with the workpiece supporting mechanism slidably mounted thereon and disposed therebetween.

7. Apparatus for successively machining axially spaced sections of an elongated workpiece as set forth in claim 6 wherein said machining operations take the form of successive precise cut-off operations in the formation of bearing race blanks from an elongated tubular workpiece.

* * * * *